(12) United States Patent
Weddington et al.

(10) Patent No.: US 10,382,354 B1
(45) Date of Patent: Aug. 13, 2019

(54) LIMITING TCP NETWORK TRAFFIC IN A SAFETY CRITICAL ENVIRONMENT

(71) Applicant: Rockwell Collins, Inc., Cedar Rapids, IA (US)

(72) Inventors: Isaac B. Weddington, Hiawatha, IA (US); Paul S. Heil, North Liberty, IA (US); Paul L. Fiegen, Cedar Rapids, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 85 days.

(21) Appl. No.: 15/631,904

(22) Filed: Jun. 23, 2017

(51) Int. Cl.
*H04L 12/927* (2013.01)
*H04L 29/06* (2006.01)
*H04L 12/911* (2013.01)

(52) U.S. Cl.
CPC .......... *H04L 47/801* (2013.01); *H04L 69/168* (2013.01); *H04L 47/70* (2013.01); *H04L 69/22* (2013.01)

(58) Field of Classification Search
CPC ..... H04L 47/801; H04L 69/168; H04L 47/70; H04L 69/22
See application file for complete search history.

(56) References Cited

U.S. PATENT DOCUMENTS

| 2006/0203728 | A1* | 9/2006 | Kwan | H04L 47/10 370/235 |
| 2007/0183330 | A1* | 8/2007 | Salt | H04L 41/0213 370/235 |
| 2014/0269284 | A1* | 9/2014 | Amanna, III | H04L 5/0037 370/230.1 |

* cited by examiner

*Primary Examiner* — Noel R Beharry
*Assistant Examiner* — Wilfred Thomas
(74) *Attorney, Agent, or Firm* — Donna P. Suchy; Daniel M. Barbieri

(57) ABSTRACT

A transmission control protocol system includes a computer readable medium including instructions configured to cause processing electronics to, for each accepted frame of a plurality of accepted frames, determine an available bandwidth, send a first frame based on the available bandwidth being sufficient to send the first frame or delay the first frame by storing the first frame and a characteristic of the first frame, determine whether the delayed first frame and a received second frame are identical, and either one of: (i) send the delayed first frame and drop the second frame in response to the delayed first frame and the second frame being identical; and (ii) send the delayed first frame and delay the second frame by storing the second frame and storing a characteristic of the second frame in response to the first frame and the second frame being different.

15 Claims, 3 Drawing Sheets

LIMITING TCP NETWORK TRAFFIC IN A SAFETY CRITICAL ENVIRONMENT

BACKGROUND

The inventive concepts disclosed herein relate generally to the field of Transmission Control Protocol ("TCP") and Internet Protocol ("IP") systems. More particularly, embodiments of the inventive concepts disclosed herein relate to delivering information across a network using traffic policing and traffic shaping strategies to reduce bandwidth when transmitting safety critical data without inefficiently using network bandwidth.

The internet includes a global network of computers with each computer having a unique IP address and configured to communicate messages, directly or indirectly, with one another. Protocol stacks are used to translate information to electronic signals for transmission over a network, such as the internet, and then to translate the transmitted electronic signals back to information. A TCP/IP protocol stack is typically used to carry out such functions. Typically, if the information to be sent from one computer over the internet to another computer is long, the information is broken up into smaller portions, known as packets, for transmission. When transmitted over the internet, packets traverse routers, internet service provider backbones, dedicated lines, and other networks until the packets reach their intended destination, using up bandwidth along the way.

Use of TCP/IP protocol stacks in airborne systems should comply with industry guidelines and regulations to ensure safe operation of safety-critical software and equipment. For example, DO-178, Software Consideration in Airborne Systems and Equipment Certification, is one such guideline for safety-critical software used in some airborne systems. However, network stacks that include TCP are expensive to develop and expensive to test to DO-178 level C or higher. Current commercial off-the-shelf products are not designed with safety as a primary concern, and therefore such products do not provide equipment capable of safety critical use of TCP with network determinism (e.g., determining routes between given pairs of nodes in advance of transmission).

SUMMARY

In one aspect, the inventive concepts disclosed herein are directed to a transmission control protocol system. The system includes a non-transitory computer readable medium comprising instructions stored thereon and processing electronics. For each frame to be transmitted of a plurality of frames requiring transmission, the instructions are configured to cause the processing electronics to determine an available bandwidth based on a token bucket value. The available bandwidth indicates whether sufficient bandwidth is available to send a first frame. For each frame requiring transmission, the instructions further cause the processing electronics to send the first frame based on the available bandwidth being sufficient to send the first frame, or delay the first frame by storing the first frame and storing a characteristic of the delayed first frame; determine whether the delayed first frame and a second frame are identical by comparing the characteristic of the delayed first frame with a characteristic of the second frame; and either one of (i) send the delayed first frame and drop the second frame in response to the delayed first frame and the second frame being identical, and (ii) send the delayed first frame and delay the second frame by storing the second frame and storing a characteristic of the second frame in response to the first frame and the second frame being different.

In a further aspect, the inventive concepts disclosed herein are directed to a method for sending a plurality of frames. The method includes determining an available bandwidth based on a token bucket value, where the available bandwidth indicates whether sufficient bandwidth is available to send a first frame of the plurality of frames, delaying the first frame by storing the first frame and storing a characteristic of the delayed first frame, determining whether the delayed first frame and a second frame of the plurality of frames are identical by comparing the characteristic of the delayed first frame with a characteristic of the second frame, and either one of (i) sending the delayed first frame and dropping the second frame in response to the delayed first frame and the second frame being identical, and (ii) sending the delayed first frame and delaying the second frame by storing the second frame and storing a characteristic of the second frame in response to the first frame and the second frame being different.

In a further aspect, the inventive concepts disclosed herein are directed to a method of policing and shaping traffic in a transmission control protocol system. The method includes accepting a plurality of frames in a sequential order, determining an available bandwidth based on a token bucket value where the available bandwidth indicating whether sufficient bandwidth is available to send an earlier accepted frame of the plurality of frames, delaying sending the earlier accepted frame by storing the earlier accepted frame and storing a characteristic of the delayed earlier accepted frame, determining whether the delayed earlier accepted frame and a later accepted frame are identical by comparing the characteristic of the delayed earlier accepted frame with a characteristic of later accepted frame, and for each accepted frame of the plurality of accepted frames, either one of (i) conduct a traffic policing process, or (ii) conduct a traffic shaping process. For at least one of the accepted frames, the system switches from the traffic policing process to the traffic shaping process.

BRIEF DESCRIPTION OF THE DRAWINGS

Implementations of the inventive concepts disclosed herein may be better understood when consideration is given to the following detailed description thereof. Such description makes reference to the included drawings, which are not necessary to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
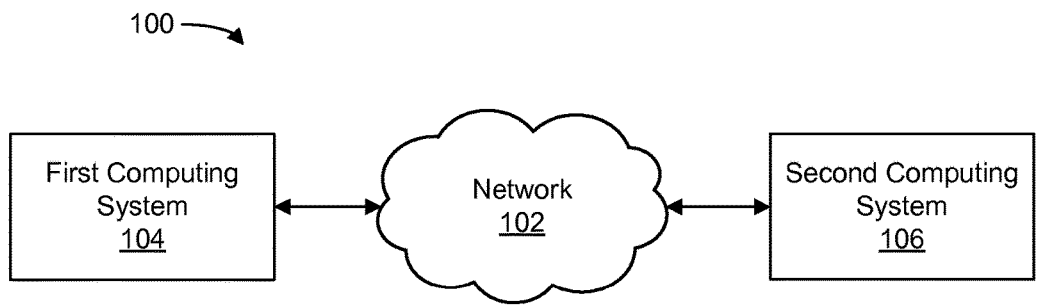
FIG. 1 is a schematic illustration of an exemplary embodiment of a network traffic control system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to limiting TCP network traffic in a safety critical environment. The inventive concepts disclosed herein can be utilized in a number of different types of software and hardware for various types of applications and in various information transmission systems. While the present disclosure describes systems and methods implementable for commercial off-the-shelf TCP systems for use in a safety-critical environment (e.g., such as use onboard an airborne aircraft), the inventive concepts disclosed herein may be used in any type of environment (e.g., in an aircraft when not airborne, a spacecraft, a locomotive control system, a self-driving vehicle, other ground based vehicles, or in a non-vehicle application such as a ground-based information transmission system, an air traffic control system). While certain examples and embodiments of the inventive concepts disclosed herein are described with respect to a pilot of an aircraft, it will be appreciated that users other than a pilot may use and benefit from the inventive concepts disclosed herein with respect to other vehicles, systems, and objects.

Referring now to FIG. 1, a schematic illustration of an exemplary embodiment of a network traffic control system 100 is shown according to the inventive concepts disclosed herein. The network traffic control system 100 includes a network 102, a first computing system 104, and a second computing system 106. The first computing system 104 and the second computing system 106 are configured to communicate information either one way (e.g., from the first computing system 104 to the second computing system 106) or two ways (e.g., between each other) over the network 102. It will be appreciated that the embodiments depicted in the Figures and described herein are exemplary only and that any number of computing systems and networks may be used according to the inventive concepts disclosed herein.

The network 102 is any data exchange medium, which may include wireless networks (e.g., cellular networks, Bluetooth®, WiFi, Zigbee®), wired networks (e.g., Ethernet, DSL, cable, fiber-based), or a combination thereof. In some embodiments, the network 102 includes the internet.

The first computing system 104 and the second computing system 106 can be any type of computing system configured to communicate information over the network 102. In one embodiment, the first computing system 104 is located onboard an aircraft that may or may not be airborne, and the second computing system 106 is located in the same aircraft (e.g., in a display or component or system/module), another vehicle (e.g., either airborne or ground-based), or in a ground-based system, such as an air traffic control facility. For example, the first computing system 104 and the second computing system 106 can be or include any of an aircraft computing system such as an electronic flight bag, a personal computer such as a desktop or laptop computer, smartphones, tablets, wearable computing devices such as smartwatches, and the like.

Figure 2:
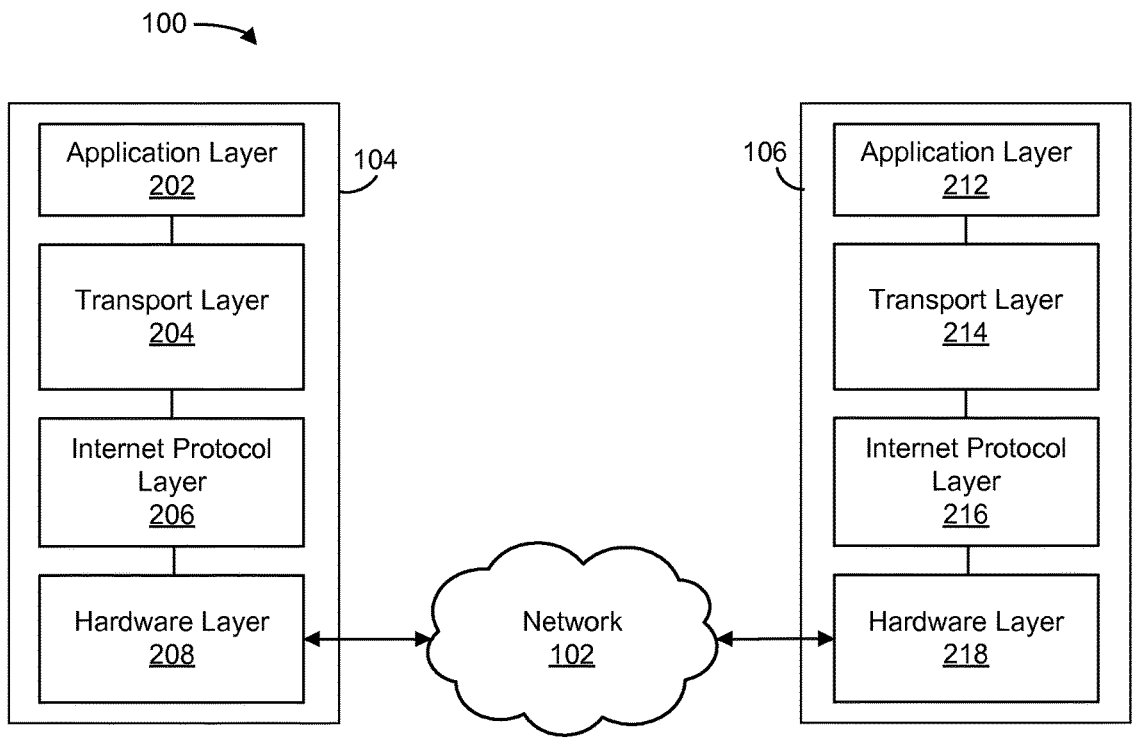
FIG. 2 is a more detailed illustration of the network traffic control system of FIG. 1.

Referring now to FIG. 2, a more detailed illustration of the network traffic control system 100 of FIG. 1 is shown according to the inventive concepts disclosed herein. As shown, the first computing system 104 of the network traffic control system 100 includes an application layer 202, a transport layer 204, an internet control protocol layer 206, and a hardware layer 208 (collectively referred to as the "output stack"). The second computing system 106 of the network traffic control system 100 includes an application layer 212, a transport layer 214, an internet control protocol layer 216, and a hardware layer 218.

The application layer 202 defines TCP/IP application protocols and how programs running on the first computing system 104 interface with the output stack. The application layer 202 is configured to provide applications abilities to exchange data over the network 102 using various communication protocols. For example, the application layer 202 can be configured to facilitate transfer of web page files using the Hypertext Transfer Protocol ("HTTP"), facilitate transfer of interactive files using File Transfer Protocol ("FTP"), and facilitate transfer of email messages using the Simple Mail Transfer Protocol ("SMTP"). The application layer 202 can be configured to facilitate the use and management of the TCP/IP network, for example, by using the Domain Name System ("DNS") to resolve a host name to an IP address, the Routing Information Protocol ("RIP") to exchange routing information on the internet via routers. It will be appreciated that applications of the application layer 202 can also use their own proprietary communication protocols, which may be private protocols (i.e., non-public protocols).

The transport layer 204 is configured to permit applications on the first computing system 104 and the second computing system 106 to communicate data back and forth. The transport layer 204 is configured to control the level of service and status of a connection between the first computing system 104 and the second computing system 106 when communicating data with one another. The transport layer 204 can facilitate communications between the first computing system 104 and the second computing system 106 using different protocols such as the Transmission Control Protocol and User Datagram Protocol.

The internet control protocol layer 206 is configured to facilitate communications between the first computing system 104 and the second computing system 106 by addressing, packaging, and routing information. The internet control protocol layer 206 can facilitate communications between the first computing system 104 and the second computing system 106 using different protocols such as the Internet Protocol (IP), the Internet Control Message Protocol ("ICMP"), and the Internet Group Management Protocol ("IGMP").

The hardware layer 208 is comprised of hardware components and configured to manage the interface between the first computing system 104 and the second computing system 106 with the network 102. The hardware layer 208 may include a Network Interface Layer/Network Access Layer. The hardware layer 208 is configured to facilitate transmission and receipt of frames and packets from the network 102. The hardware layer 208 may include a controller 210 configured to manage the transmission of frames and packets over the network 102.

Figure 3:
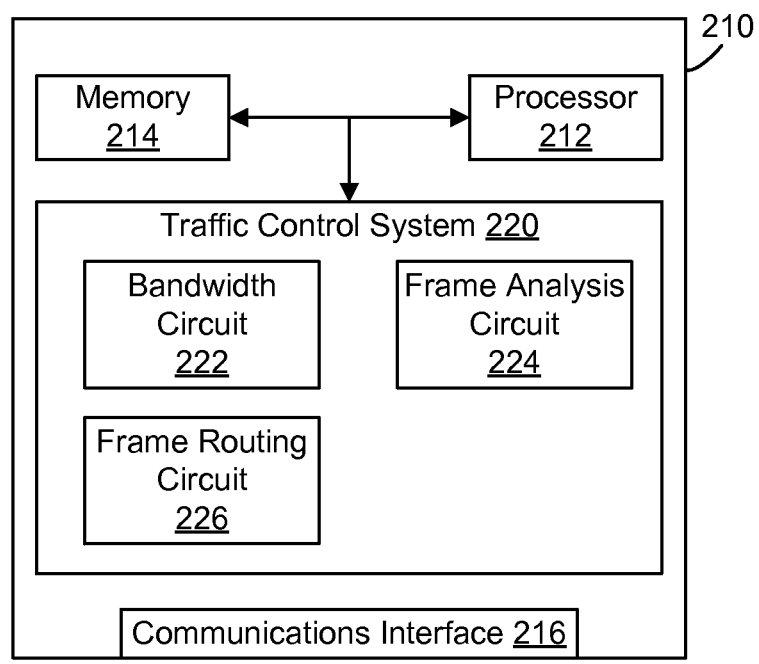
FIG. 3 is a block diagram of an exemplary embodiment of a controller for a hardware layer of a first computing system of the network traffic control system shown in FIG. 2.

Referring now to FIG. 3, a block diagram of an exemplary embodiment of the controller 210 for the hardware layer 208 of the first computing system 104 of the network traffic control system 100 of FIG. 2 is shown according to the inventive concepts disclosed herein. The controller 210 includes a processor 212, a memory 214, a communications interface 216, and a traffic control system 220. The communications interface 216 is configured to facilitate communications between the controller 210 and the other components and systems of the network traffic control system 100.

The processor 212 may be implemented as a general or specific purpose processor, an application specific integrated circuit (ASIC), one or more field programmable gate arrays (FPGAs), a group of processing components, or other suitable electronic processing components. The memory 214 is one or more devices (e.g., RAM, ROM, flash memory, hard disk storage) for storing data and computer code for completing and facilitating the various user or client processes, layers, and modules described in the present disclosure. The memory 214 may be or include volatile memory or non-volatile memory and may include database components, object code components, script components, or any other type of information structure for supporting the various activities and information structures of the inventive concepts disclosed herein. The memory 214 is communicably connected to the processor 212 and includes computer code or instruction modules for executing one or more processes described herein.

The memory 214 includes one or more memory devices for storing instructions that are executable by the processor 212 to carry out the functions of the network traffic control system 100. The memory 214 may store various data, such as packets or frames as part as their transmission from the first computing system 104 to the second computing system 106. The memory 214 (e.g., RAM, ROM, Flash Memory, hard disk storage, etc.) may store data and/or computer code for facilitating the various processes described herein. The memory 214 may be communicably connected to the processor 212 to provide computer code or instructions to the processor 212 for executing at least some of the processes described herein. Moreover, the memory 214 may be or include tangible, non-transient volatile memory or non-volatile memory. Accordingly, the memory 214 may include database components, object code components, script components, or any other type of information structure for supporting the various activities and information structures described herein.

The traffic control system 220 includes a bandwidth circuit 222, a frame analysis circuit 224, and a frame routing circuit 226. In some embodiments, the bandwidth circuit 222, the frame analysis circuit 224, and the frame routing circuit 226 are embodied as machine or computer-readable media that is executable by a processor, such as processor 212. As described herein and amongst other uses, the machine-readable media facilitates performance of certain operations to enable reception and transmission of data. For example, the machine-readable media may provide an instruction (e.g., command, etc.) to acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the bandwidth circuit 222, the frame analysis circuit 224, and the frame routing circuit 226 are embodied as hardware units, such as electronic control units. As such, the bandwidth circuit 222, the frame analysis circuit 224, and the frame routing circuit 226 may be embodied as one or more circuitry components including, but not limited to, processing circuitry, network interfaces, peripheral devices, input devices, output devices, sensors, etc. In some embodiments, the bandwidth circuit 222, the frame analysis circuit 224, and the frame routing circuit 226 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the bandwidth circuit 222, the frame analysis circuit 224, and the frame circuit 226 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The bandwidth circuit 222, the frame analysis circuit 224, and the frame routing circuit 226 may also include programmable hardware devices such as field programmable gate arrays, programmable array logic, programmable logic devices or the like. The bandwidth circuit 222, the frame analysis circuit 224, and the frame routing circuit 226 may include one or more memory devices for storing instructions that are executable by the processor(s) of the bandwidth circuit 222, the frame analysis circuit 224, and the frame routing circuit 226. The one or more memory devices and processor(s) may have the same definition as provided herein with respect to the memory 214 and the processor 212. In some hardware unit configurations, the bandwidth circuit 222, the frame analysis circuit 224, and the frame routing circuit 226 may be physically located in separate locations in the first computing system 104. Alternatively, and as shown, the bandwidth circuit 222, the frame analysis circuit 224, and the frame routing circuit 226 may be embodied in or within a single unit/housing, which is shown as the traffic control system 220 of the controller 210. In some embodiments, the bandwidth circuit 222, the frame analysis circuit 224, and the frame routing circuit 226 can be a hybrid of any device disclosed above, such as a specific purpose processor or task execution unit (e.g., configured to execute a micronode) with additional circuitry specifically configured to execute bandwidth calculations, frame analysis, or routing determinations.

The bandwidth circuit 222 is configured to determine an available bandwidth for transmission of data across the network 102. The available bandwidth indicates whether sufficient bandwidth is available to send a first frame across the network 102. In some embodiments, the bandwidth circuit 222 is configured to determine the available bandwidth based on a token bucket value. The bandwidth circuit 222 communicates whether there is sufficient available bandwidth (e.g., with relation to how much bandwidth the data is allowed to consume and not how much bandwidth is left on the network media) to send a frame to the other components of the traffic control 220 or to the processor 212.

The frame analysis circuit 224 is configured to determine whether a first accepted frame and a second accepted frame are identical. The frame analysis circuit 224 is configured to determine whether the first accepted frame and second accepted frame are identical by comparing the characteristic of the first frame with a characteristic of the second frame. In some embodiments, the first frame may be delayed due to the bandwidth circuit 222 determining that there is insufficient bandwidth available to send the first frame. Accordingly, the frame analysis circuit 224 is configured to compare a characteristic of the delayed first frame with a characteristic of the second frame to determine if the delayed first frame and the second frame are the same or different from one another.

In some embodiments, the characteristic that the frame analysis circuit 224 compares of the delayed first frame and the second frame is at least one of a TCP checksum, a frame length, a sequence, and an acknowledgement number. In some embodiments, the frame analysis circuit 224 is configured to determine whether the delayed first frame is the same as the second frame by first comparing the checksum of the delayed first frame with a checksum of the second frame, then comparing another characteristic of the delayed first frame with another characteristic of the second frame if the checksum of the delayed first frame and the checksum of the second frame match. In some embodiment, another characteristic of the first frame and another characteristic of the second frame is a frame length. It will be appreciated that any characteristic of the first frame and the second frame may be compared by the frame analysis circuit 224 to determine if the first frame and the second frame are identical.

In some embodiments, the frame analysis circuit 224 is configured to compare the characteristics of the delayed first frame and the delayed second frame in the following order of priority: the checksum, the frame length, the sequence, and the acknowledgement number in order. The frame analysis circuit is configured to stop comparing the characteristics of the delayed first frame and the delayed second frame once one of the characteristics is determined to be different By comparing a first characteristic, then a second characteristic, and so on, and stopping the comparison once the frame analysis circuit 224 determines that the first and second frames are different frames, a significant amount of processing power can be saved by not comparing every characteristic of the first and second frames. All the details needed for the frame analysis circuit 224 to determine whether a first frame is identical to a second frame can be found in a TCP header for the frames. During a retransmission, TCP sequence and acknowledgement values do not change, and as a result the TCP headers are identical in a retransmission situation. The processing power overhead of comparing entire TCP headers could be high in some instances. However, in cases where the TCP maintains a 16-bit checksum in every outgoing header, a retransmitted frame can be detected with a high degree of certainty by just comparing the checksums, and the comparison can be completed without wasting bandwidth or processing power and processing time. To further avoid checksum collisions, the frame analysis circuit 224 may be further configured to compare the overall length of the frame as well as the sequence and acknowledgement numbers without requiring the use of much more additional processing power and processing time.

The frame routing circuit 226 is configured to take an action with respect to a frame accepted for transmission. For example, the frame routing circuit 226 is configured to send a frame, delay a frame, or drop a frame. For example, the frame routing circuit 226 is configured to send a first frame based on the available bandwidth being sufficient to send the first frame (e.g., as determined by the bandwidth circuit 222), or delay the first frame by storing the first frame and storing a characteristic of the delayed first frame based on the available bandwidth not being sufficient to send the first frame (e.g., as determined by the bandwidth circuit 222). In another example, the frame routing circuit 226 is configured to delay a plurality of frames and to send a subsequently frame accepted for transmission once the plurality of delayed frames have been sent based on the available bandwidth being sufficient to send the subsequent frame.

In some embodiments, the frame routing circuit 226 can determine to, and carryout, either a traffic shaping process or a traffic policing process, for a frame accepted for transmission. The traffic policing process includes (i) sending a delayed first frame and dropping a second frame in response to the delayed first frame and the second frame being identical. In some embodiments, the traffic policing process includes sending the second frame and dropping the delayed first frame, since these frames are identical and it does not matter which frame is sent so long as one of them is sent. The traffic shaping process includes (ii) sending a delayed first frame and delaying a second frame by storing the second frame and storing a characteristic of the second frame in response to the first frame and the second frame being different.

Switching between a traffic policing processing and a traffic shaping process provides the most efficiency in terms of bandwidth allocation, processing power, and processing time. For example, the frame routing circuit 226 may be configured to use traffic shaping by default by holding frames back that cannot be immediately transmitted. Each time a frame is held back, the frame analysis circuit 224 uses packet inspection to save the TCP checksum, sequence number, acknowledgement number, and the payload length. Each time a subsequent frame is held back, the frame analysis circuit 224 checks if the frame is identical to the previous held frame, which indicates that the frame was retransmitted. The frame analysis circuit 224 does not need to compare the whole frame or conduct a hash of the payload, but simply compare the frame's TCP checksum, sequence number, and acknowledgement number, and length to the values of the same saved for the earlier received and held frame. Then, if the values match, the frame routing circuit 226 uses traffic policing to drop the frame. If the values do not match, the frame routing circuit 226 uses traffic shaping to hold the frame and to update the values saved. The frame analysis circuit 225 can be configured to compare the checksum of the earlier received held frame with the checksum of the subsequently accepted frame as any differences between the two frames would likely affect the checksum. Only if there is a checksum match would the frame analysis circuit 224 compare the other values to guard against checksum collisions.

The frame routing circuit 226 is configured to switch between (i) the traffic shaping process and (ii) the traffic policing process for different frames accepted for transmission. Switching between the traffic shaping process and the traffic policing process more efficiently processes and transmits accepted frames because processing and transmission inefficiencies of current network traffic control systems are eliminated. In some embodiments, a state machine can be used to determine when to traffic shape and when to traffic police based solely on TCP header fields, as discussed herein with respect to the frame analysis circuit 224. In some embodiments, the frame routing circuit 226 is configured to either one of conduct a traffic shaping process or a traffic policing process only if there is an insufficient amount of bandwidth to transmit an accepted frame without delay. By not always traffic shaping and holding back frames, the frame routing circuit 226 ensures that components of the network traffic control system 100 do not use up all available bandwidth by just trying to send and receive acknowledgments. In some embodiments, the frame routing circuit 226 switches from conducting the traffic shaping process to the traffic policing process, continues to conduct the traffic policing process for a plurality of frames accepted for transmission and then switches back to conducting the traffic shaping process for a second plurality of accepted frames. In some embodiments, the frame routing circuit 226 switches from conducting the traffic shaping process to the traffic policing process and then back to the traffic shaping process for each frame accepted for transmission if the frame analysis circuit 224 determines that switching between the two processes is appropriate.

For example, a potential drawback of just carrying out a network policing process is the result of numerous TCP retransmissions from a remote peer, which uses up the peer's bandwidth allocation. Just carrying out a network policing process further complicates using any kind of traffic shaping. However, just carrying out a network shaping process causes a local host to always delay the transmissions of a TCP/IP stack until there is enough available bandwidth (e.g., until there are enough tokens in the bandwidth token bucket). For a high-bandwidth network connection, always traffic shaping may be acceptable for some network control transmission systems because the token bucket will fill quickly enough to permit a relatively small acknowledgement frame to be transmitted. However, for low-bandwidth network connections, the local host and remote peer will get caught in a situation where the remote peer continuously generates TCP retransmissions because the local host cannot acknowledge the sent data. Eventually an acknowledgement will be sent, but then some number of duplicate acknowledgements will have been queued up by the traffic shaping mechanism and will also be sent. This will consume tokens from the local host's bucket and will cause inefficiency by sending duplicate frames. One way to prevent this situation would be to allocate extra tokens to flows to permit the TCP to work itself out of the situation. Another way to prevent this situation would be to always configure low-bandwidth flows with a high enough token rate that the acknowledgements would be sent before the remote peer initiates a TCP retransmission. However, in either case, requiring the additional tokens result in a higher bandwidth allocation to a flow that would otherwise not normally need it, which results in inefficiency of the transmissions.

Figure 4:
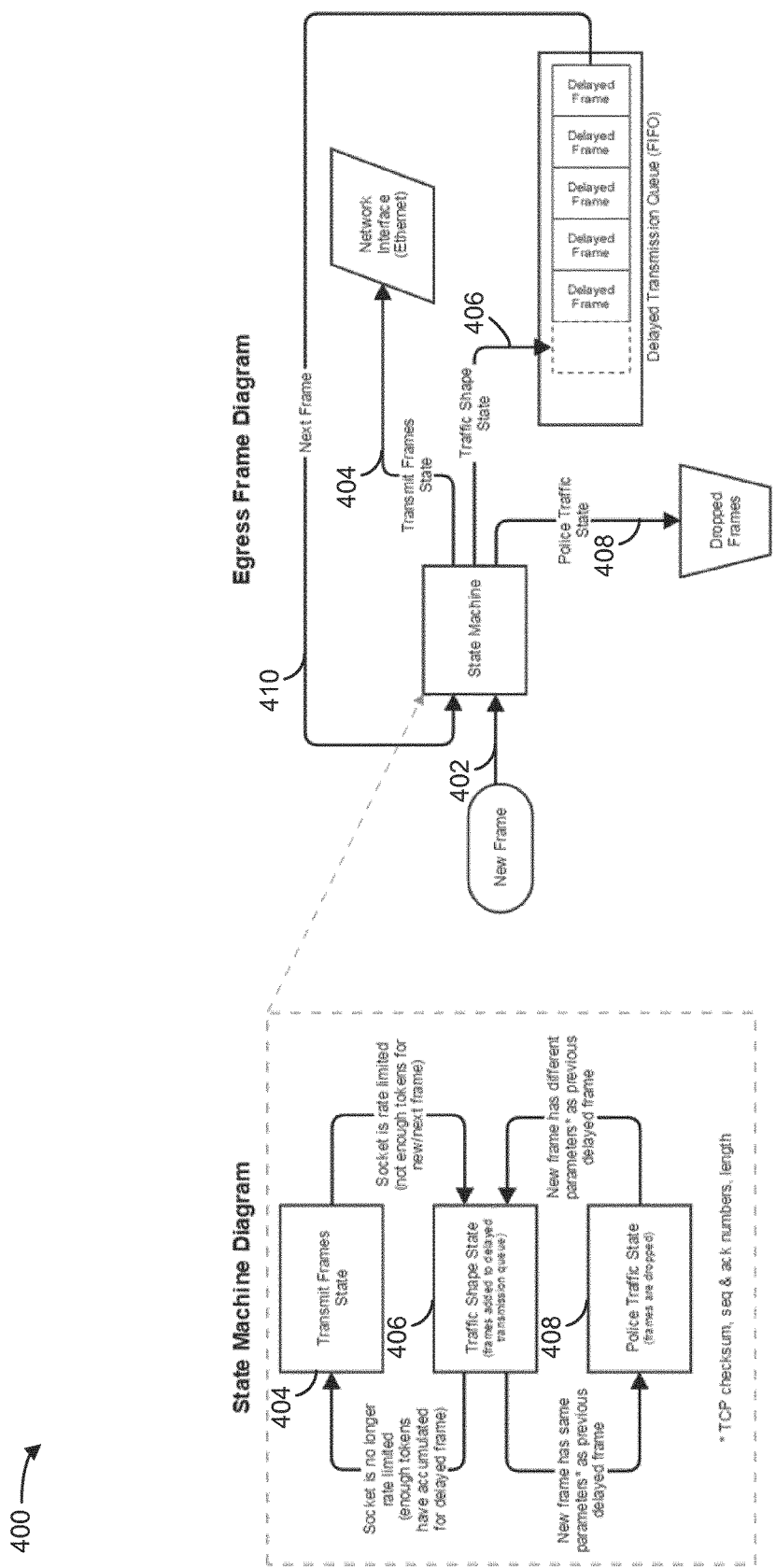
FIG. 4 is a diagram of an exemplary embodiment of a method of switching between traffic policing and traffic shaping according to the inventive concepts disclosed herein.

Referring now to FIG. 4, an exemplary embodiment of a method 400 of switching between traffic policing and traffic shaping is shown according to the inventive concepts disclosed herein. The method 400 includes one or more of the following steps.

A step (402) may include accepting a new frame at the controller 210 for transmission to the second computing system 106. The controller 210 may take the form of a state machine or other hardware or software portion of the hardware layer 208.

A step (404) may include a transmission of the frame over the network 102 to the second computing system 106 via a network interface (e.g., via Ethernet). The controller 210 may be configured to transmit the frame over the network when a socket is not rate limited (e.g., enough bandwidth is available to transmit the frame over the network 102, meaning the token bucket has accumulated enough tokens for sending the frame and any delayed frames).

A step (406) may include a traffic shaping process. The traffic shaping process comprises sending a delayed first accepted frame and then delaying a second accepted frame by storing the second accepted frame and storing a characteristic of the second accepted frame in response to the first accepted frame and the second accepted frame being different. The controller 210 is configured to carry out step 406 when the socket is rate limited such that there are not enough tokens in the bucket to send the next frame (e.g., there is not enough bandwidth to send the next frame). The controller 210 is configured to determine if the delayed first frame is identical to the accepted second frame. If the delayed first frame and the accepted second frame are not identical, the controller 210 is configured to delay transmission of the second accepted frame and to store the second accepted frame in a delayed transmission queue behind the delayed first frame such that when enough bandwidth is available for transmission of a frame, the controller 210 sends the frames in the same order that they were accepted.

A step (408) may include a traffic policing process. The traffic policing process comprises sending the delayed first accepted frame and dropping the second accepted frame in response to the delayed first accepted frame and the second accepted frame being identical. Dropping may comprise deleting the dropped frame. The controller 210 is configured to determine if the delayed first frame is identical to the accepted second frame. If the delayed first frame and the accepted second frame are identical, the controller 210 is configured to drop the second accepted frame such that when enough bandwidth is available for transmission of a frame, the controller 210 still has a copy of the identical frame stored and ready for transmission. In some embodiments, the controller 210 may drop the first accepted frame and store the second accepted frame for transmission. Since both frames are identical, it may not matter which frame is dropped and which frame is transmitted or stored for future transmission. The controller 210 is configured to determine if the second accepted frame (e.g., the newly accepted frame) is identical to the first accepted frame by comparing parameters of the second accepted frame with parameters of the first accepted frame, such as the TCP checksum, sequence number, acknowledgement number, and frame length.

If the controller 210 determines that a third accepted frame (e.g., another newly accepted frame) has different parameters as a previously received and delayed frame (e.g., either the first or second accepted frame), the controller returns to step 406 to conduct the traffic shaping state. The method 400 includes switches back and forth between the traffic shaping process (e.g., step 406) and the traffic policing process (e.g., step 408) based on whether later accepted frames are identical to earlier receiver frames.

A step (410) may include receiving a next frame at the controller 210 for transmission to the second computing system 106. The next frame is either accepted from the delayed transmission queue and is identical to an earlier accepted frame, or the next frame is a new frame that has not yet been accepted by the controller 210. The process continues with one of steps 404, 406, or 408.

As will be appreciated from the above, limiting TCP network traffic in a safety critical environment according to embodiments of the inventive concepts disclosed herein may more efficiently process and transmit frames because processing and transmission inefficiencies of current network traffic control systems are eliminated by not wasting bandwidth by attempting to transmit frames identical to earlier accepted frames, which saves process power, processing time, and available bandwidth.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A transmission control protocol system comprising:
a non-transitory computer readable medium comprising instructions stored thereon and processing electronics, wherein the instructions are configured to cause the processing electronics to, for each accepted frame of a plurality of accepted frames:
determine an available bandwidth based on a token bucket value, the available bandwidth indicating whether sufficient bandwidth is available to send a first frame;
send the first frame based on the available bandwidth being sufficient to send the first frame, or delay the first frame by storing the first frame and storing a characteristic of the delayed first frame;
determine whether the delayed first frame and a second frame are identical by comparing the characteristic of the delayed first frame with a characteristic of the second frame; and
either one of:
(i) send the delayed first frame and drop the second frame in response to the delayed first frame and the second frame being identical; and
(ii) send the delayed first frame and delay the second frame by storing the second frame and storing a characteristic of the second frame in response to the first frame and the second frame being different;
wherein the characteristic of at least one of the delayed first frame and the delayed second frame is at least one of a checksum, a frame length, a sequence, and an acknowledgement number;
wherein the instructions are configured to cause the processing electronics to compare the characteristics of the delayed first frame and the delayed second frame in the following order of priority: the checksum, the frame length, the sequence, and the acknowledgement number in order; and
wherein the instructions are configured to cause the processing electronics to stop comparing the characteristics of the delayed first frame and the delayed second frame once one of the characteristics is determined to be identical.

2. The system of claim 1, wherein the instructions are configured to cause the processing electronics to switch between (i) dropping the second frame and sending the delayed first frame and (ii) sending the delayed first frame and delaying the second frame, wherein the first frame is any earlier accepted frame and the second frame is any later accepted frame.

3. The system of claim 1, wherein the instructions are configured to cause the processing electronics to delay a plurality of frames and to send a subsequently accepted frame once the plurality of delayed frames have been sent based on the available bandwidth being sufficient to send the subsequent frame.

4. The system of claim 1, wherein the characteristic of at least one of the delayed first frame and the delayed second frame is a checksum, wherein the instructions are configured to cause the processing electronics to determine whether the delayed first frame is the same as the second frame by first comparing the checksum of the delayed first frame with a checksum of the second frame, then comparing another characteristic of the delayed first frame with another characteristic of the second frame if the checksum of the delayed first frame and the checksum of the second frame match.

5. The system of claim 4, wherein the another characteristic of the first frame and the another characteristic of the second frame is a frame length.

6. A method for sending a plurality of frames, the method comprising:
determining an available bandwidth based on a token bucket value, the available bandwidth indicating whether sufficient bandwidth is available to send a first frame of the plurality of frames;

delaying the first frame by storing the first frame and storing a characteristic of the delayed first frame;

determining whether the delayed first frame and an accepted second frame of the plurality of frames are identical by comparing the characteristic of the delayed first frame with a characteristic of the second frame, wherein the characteristic of at least one of the delayed first frame and the delayed second frame is at least one of a checksum, a frame length, a sequence, and an acknowledgement number;

comparing the characteristics of the delayed first frame and the delayed second frame in the following order of priority: the checksum, the frame length, the sequence, and the acknowledgement number in order;

either one of:
(i) sending the delayed first frame and dropping the second frame in response to the delayed first frame and the second frame being identical; and
(ii) sending the delayed first frame and delaying the second frame by storing the second frame and storing a characteristic of the second frame in response to the first frame and the second frame being different; and causing the processing electronics to stop comparing the characteristics of the delayed first frame and the delayed second frame once one of the characteristics is determined to be identical.

7. The method of claim 6, further comprising switching between (i) dropping the second frame and sending the delayed first frame and (ii) sending the delayed first frame and delaying the second frame, wherein the first frame is any earlier accepted frame and the second frame is any later accepted frame.

8. The method of claim 6, further comprising delaying a plurality of frames and sending a subsequently accepted frame once the plurality of delayed frames have been sent based on the available bandwidth being sufficient to send the subsequent frame.

9. The method of claim 6, wherein the characteristic of at least one of the delayed first frame and the delayed second frame is a checksum, the method further comprising determining whether the delayed first frame is the same as the second frame by first comparing the checksum of the delayed first frame with a checksum of the second frame, then comparing another characteristic of the delayed first frame with another characteristic of the second frame if the checksum of the delayed first frame and the checksum of the second frame match.

10. The method of claim 9, wherein the another characteristic of the first frame and the another characteristic of the second frame is a frame length.

11. A method of policing and shaping traffic in a transmission control protocol system, the method comprising:

accepting a plurality of frames in a sequential order;

determining an available bandwidth based on a token bucket value, the available bandwidth indicating whether sufficient bandwidth is available to send an earlier accepted frame of the plurality of frames;

delaying sending the earlier accepted frame by storing the earlier accepted frame and storing a characteristic of the delayed earlier accepted frame;

determining whether the delayed earlier accepted frame and a later accepted frame are identical by comparing the characteristic of the delayed earlier accepted frame with a characteristic of later accepted frame;

comparing the characteristics of the delayed first frame and the delayed second frame in the following order of priority: the checksum, the frame length, the sequence, and the acknowledgement number in order; and for each accepted frame of the plurality of accepted frames, either one of:
(i) conduct a traffic policing process; or
(ii) conduct a traffic shaping process;

wherein for at least one of the accepted frames, the system switches from the traffic policing process to the traffic shaping process.

12. The method of claim 11, wherein the traffic policing process comprises sending the delayed earlier accepted frame and dropping the later accepted frame in response to the delayed earlier accepted frame and the later accepted frame being identical.

13. The method of claim 11, wherein the traffic shaping process comprises sending the delayed earlier accepted frame and delaying the later accepted frame by storing the later accepted frame and storing a characteristic of the later accepted frame in response to the earlier accepted frame and the later accepted frame being different.

14. The method of claim 11, wherein the characteristic of at least one of the delayed earlier accepted frame and the delayed later accepted frame is at least one of a checksum, a frame length, a sequence, and an acknowledgement number.

15. The method of claim 11, further comprising terminating the comparison of the characteristics of the delayed first frame and the delayed second frame once one of the characteristics is determined to be identical.

\* \* \* \* \*